US009736099B2

(12) United States Patent
Kaplinger et al.

(10) Patent No.: US 9,736,099 B2
(45) Date of Patent: Aug. 15, 2017

(54) PREVENTING MESSAGES FROM BEING SENT USING INAPPROPRIATE COMMUNICATION ACCOUNTS

(71) Applicant: International Business Machines Corporation, Armonk, NY (US)

(72) Inventors: Todd E. Kaplinger, Raleigh, NC (US); Katie M. Keating, New York, NY (US); Aaron J. Quirk, Cary, NC (US); Davanum M. Srinivas, Sharon, MA (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 14/296,983

(22) Filed: Jun. 5, 2014

(65) Prior Publication Data

US 2015/0358265 A1    Dec. 10, 2015

(51) Int. Cl.
*G06F 15/16* (2006.01)
*H04L 12/58* (2006.01)
*G06F 17/30* (2006.01)

(52) U.S. Cl.
CPC ........ *H04L 51/12* (2013.01); *G06F 17/30876* (2013.01); *H04L 51/32* (2013.01)

(58) Field of Classification Search
CPC ....... H04L 51/12; H04L 51/32; H04L 12/585; H04L 29/06; H04L 51/10; H04L 51/16;
(Continued)

(56) References Cited

U.S. PATENT DOCUMENTS 7,620,387 B2    11/2009  Rybak
8,135,787 B2 *  3/2012   Bansal ................. H04L 12/581
                                              709/204
(Continued)

FOREIGN PATENT DOCUMENTS

WO      2013116848 A2    8/2013

OTHER PUBLICATIONS

U.S. Patent Application entitled "Correlating Contact Type with Appropriate Communications to Eliminate Inadvertent Communications," filed on Jan. 13, 2015, pp. 1-28.
(Continued)

*Primary Examiner* — Dustin Nguyen
*Assistant Examiner* — Hao Nguyen
(74) *Attorney, Agent, or Firm* — Robert A. Voigt, Jr.; Winstead, P.C.

(57) ABSTRACT

A method, system and computer program product for preventing messages from being sent using inappropriate communication accounts. A message created by a user of a mobile device is analyzed to identify the topic and sentiment. The appropriateness of the message being sent to the intended recipient(s) using a selected communication account (e.g., company social media account) is determined based on one or more factors, including the analysis of the message to identify the topic and sentiment. A score is generated as to the appropriateness of sending the message to the intended recipient(s) based on such an analysis. If the score is less than a threshold value, then the message is deemed to not be appropriate to be sent to the intended recipients using the selected communication account. In this manner, potentially erroneous communications, such as accidentally posting a message to a wrong social media account, may be prevented.

10 Claims, 3 Drawing Sheets

(58) Field of Classification Search
CPC ..... H04L 51/28; H04L 63/105; H04L 67/306; G06F 17/30876; G06F 21/552; G06F 21/60; G06F 21/6245; G06F 21/64; G06Q 50/01
USPC ............ 709/204, 206, 226, 227, 228; 704/9; 726/1
See application file for complete search history.

(56) References Cited

U.S. PATENT DOCUMENTS

| | | | |
|---|---|---|---|
| 8,542,606 | B2 | 9/2013 | Yach et al. |
| 8,675,845 | B2 | 3/2014 | Rybak |
| 8,892,672 | B1* | 11/2014 | Rackliffe ................. H04L 51/32 709/206 |
| 8,903,926 | B2 | 12/2014 | Bastide et al. |
| 2003/0105815 | A1* | 6/2003 | Gusler ................. H04L 12/1831 709/204 |
| 2005/0198125 | A1* | 9/2005 | Macleod Beck .... G06Q 10/107 709/204 |
| 2007/0294428 | A1 | 12/2007 | Guy et al. |
| 2008/0168142 | A1 | 7/2008 | Chung |
| 2009/0157824 | A1 | 6/2009 | Chu |
| 2009/0307316 | A1 | 12/2009 | Murphy et al. |
| 2010/0223335 | A1 | 9/2010 | Fu et al. |
| 2012/0011192 | A1 | 1/2012 | Meister et al. |
| 2012/0291087 | A1 | 11/2012 | Agrawal |
| 2013/0191474 | A1 | 7/2013 | Goel et al. |
| 2013/0282841 | A1* | 10/2013 | Bates ...................... H04L 51/32 709/206 |
| 2013/0290426 | A1 | 10/2013 | Sorensen |
| 2013/0304827 | A1* | 11/2013 | Bastide ................... H04L 51/32 709/206 |
| 2014/0195933 | A1 | 7/2014 | Rao DV |
| 2015/0149153 | A1* | 5/2015 | Werth ................. G06F 17/2785 704/9 |
| 2015/0215252 | A1 | 7/2015 | Rackliffe |
| 2016/0205052 | A1* | 7/2016 | DeLuca .................. H04L 51/12 709/206 |

OTHER PUBLICATIONS

Murayama et al., "Usability Issues in Security," Security Protocols 2012, LNCS 7622, 2012, pp. 161-171.
Anonymously, "Mobile-Side Configurable Pseudo-Email and Phone-Call Receiving Filter for Alerting Users Intelligently Based on Different Personal Preferences and Email Priority Levels," IP.com No. IPCOM000130466D, Oct. 31, 2005, pp. 1-4.
Anonymously, "Securing Sensitive Emails and Messages," IP.com No. IPCOM000226589D, Apr. 17, 2013, pp. 1-4.
"Phone.com Mobile. Connected on the go," http://www.phone.com/features/mobile_office.php, at least as early as May 2014, pp. 1-9.
Juan Carlos Perez, "Gmail Detects Potential Recipient Mistakes in Group E-mails," http://www.pcworld.com/article/173574/article.html, Oct. 13, 2009, pp. 1-8.
Jon Perlow, "New in Labs: Stop Sending Mail You Later Regret," http://gmailblog.blogspot.com/2008/10/new-in-labs-stop-sending-mail-you-later.html, Oct. 6, 2008, pp. 1-2.
Adam Dachis, "How to Undo and Avoid Sending Accidentally Embarrassing Messages," http://lifehacker.com/how-to-undo-and-avoid-sending-accidentally-embarrassing-1482737736, Dec. 17, 2013, pp. 1-6.
List of IBM Patents or Patent Applications Treated as Related, Jun. 9, 2015, pp. 1-2.
List of IBM Patents or Patent Applications Treated as Related, 2015, pp. 1-2.
Zaino, Jennifer, "Contextual Analysis Tool Could Have Helped Pinpoint U.K. Riot Locations," http://semanticweb.com/contextual-analysis-tool-could-have-helped-pinpoint-u-k-riot-locations_b22417, Aug. 18, 2011, pp. 1-3.
Edge, Abigail, "Managing Multiple Twitter Profiles: What to do if You Post to the Wrong Account," http://abigailedge.co.uk/2012/07/09/managing-multiple-twitter-profiles-what-to-do-if-you-post-to-the-wrong-account, Jul. 9, 2012, pp. 1-4.
Office Action for U.S. Appl. No. 14/734,594 dated Oct. 7, 2016, pp. 1-39.
Office Action for U.S. Appl. No. 14/608,853 dated Oct. 25, 2016, pp. 1-30.
Office Action for U.S. Appl. No. 14/734,594 dated May 8, 2017, pp. 1-33.

* cited by examiner

PREVENTING MESSAGES FROM BEING SENT USING INAPPROPRIATE COMMUNICATION ACCOUNTS

TECHNICAL FIELD

The present invention relates generally to enterprise mobility, and more particularly to preventing messages from being sent using inappropriate communication accounts.

BACKGROUND

A growing trend among businesses is to allow employees to use their personally owned mobile devices both to access company resources and to use and access their personal applications and data. This trend, known as "bring your own device" ("BYOD"), significantly complicates the task of protecting enterprise resources, including confidential and/or sensitive information, as well as provides the opportunity for the user to inadvertently post messages using an inappropriate communication account.

For example, it is common for a user to have multiple e-mail, social media and other communication accounts managed by the same mobile device. For instance, a social manager may have an official company Twitter® handle as well as a personal Twitter® handle. A message could be posted to either account via the same application on the mobile device. As a result, it is not uncommon for the user to accidentally post a message to one of the accounts (e.g., corporate account) that was meant to be posted to the other account (e.g., personal account) which contained some questionable content. In such situations, the user may even lose his/her job as a result of the accidental posting.

In another example, a user may send company confidential information through the user's personal e-mail account (e.g., Gmail® account), as opposed to the user's company e-mail account, with less security controls thereby posing a potential security leak.

Attempts have been made to address security leaks via the use of authentication credentials. However, in the BYOD scenario, the user would still be able to send confidential or sensitive information across multiple communication channels since the user has valid authentication credentials. Furthermore, the user's posting of a message, such as a message containing company confidential information, using an inappropriate communication account (e.g., personal e-mail account) may be accidental.

Unfortunately, there is not currently a means for preventing such erroneous communications.

BRIEF SUMMARY

In one embodiment of the present invention, a method for preventing messages from being sent using inappropriate communication accounts comprises receiving a message from a user to be sent to one or more recipients using a selected communication account. The method further comprises identifying the one or more recipients to receive the message. The method additionally comprises analyzing the message to identify a topic and a sentiment using natural language processing. Furthermore, the method comprises determining, by a processor, an appropriateness of the message to be sent to the one or more recipients using the selected communication account based on the analysis of the message. Additionally, the method comprises generating a score as to the appropriateness of sending the message to the one or more recipients based on the determination of the appropriateness of the message. In addition, the method comprises displaying a user message regarding potentially sending the message to the one or more recipients using an inappropriate communication account in response to the score being less than a threshold.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
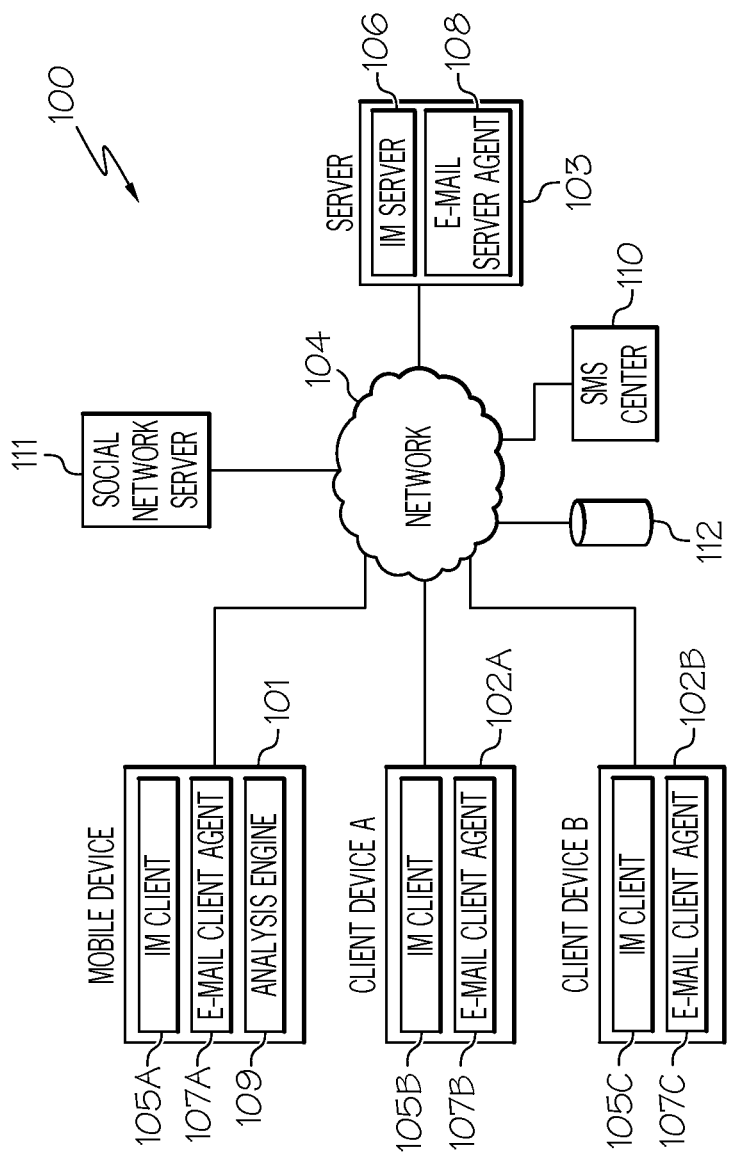
FIG. 1 illustrates a communication system configured in accordance with an embodiment of the present invention.

The present invention comprises a method, system and computer program product for preventing messages from being sent using inappropriate communication accounts. In one embodiment of the present invention, a message created by a user of a mobile device to be sent to intended recipients using a selected communication account (e.g., personal e-mail account, personal social media account) is received and the intended recipient(s) are identified. The message is then analyzed to identify the topic and sentiment using natural language processing. The appropriateness of the message being sent to the intended recipient(s) using the selected communication account is determined based on one or more factors, including the analysis of the message to identify the topic and sentiment, as well as historical communications with the intended recipient(s), the time of the intended communication, domain analysis, analysis of lists of allowed and/or disallowed recipients to receive messages using particular communication accounts and/or text analysis rules provided by others in the user's social network. A score is generated as to the appropriateness of sending the message to the intended recipient(s) based on such an analysis. Such a score may then be compared with a threshold value, which may be user selected, to determine whether to permit or prevent the user from sending the message to the intended recipient(s). If the score is less than a threshold value, then the message is deemed to not be appropriate to be sent to the intended recipients using the selected communication account (e.g., company social media account). In this manner, potentially erroneous communications, such as accidentally posting a message to a wrong social media account or e-mailing company confidential information using a personal e-mail account, may be prevented.

While the following discusses the present invention in connection with preventing erroneous communications by a user of a mobile device, such as a mobile device used by an employee in an enterprise environment where the enterprise implements a BYOD policy, the principles of the present invention may be applied to non-mobile computing devices. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a communication system 100 for practicing the principles of the present invention in accordance with an embodiment of the present invention. Communication system 100 includes a mobile device 101 and client devices 102A-102B (identified as "Client Device A," and "Client Device B," respectively, in FIG. 1) connected to a server 103 via a network 104. Client devices 102A-102B may collectively or individually be referred to as client devices 102 or client device 102, respectively.

Mobile device 101 may be any mobile computing device (e.g., mobile phone, cellular phone, smartphone, personal digital assistance (PDA), gaming unit, portable computing unit, tablet computer and the like) configured with the capability of connecting to network 104 and consequently communicating with client devices 102 and server 103.

Client device 102 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 104 and consequently communicating with mobile device 101, other client devices 102 and server 103.

Mobile device 101, client device 102 may be configured to send and receive text-based messages in real-time during an instant messaging session. Any user of mobile device 101, client device 102 may be the creator or initiator of an instant message (message in instant messaging) and any user of mobile device 101, client device 102 may be a recipient of an instant message. Furthermore, any user of mobile device 101, client device 102 may be able to create, receive and send e-mails. Additionally, any user of mobile device 101, client device 102 may be able to send and receive text messages, such as Short Message Services (SMS) messages. The term "messages," as used herein, encompasses each of these types of messages as well as posts to social media websites, such as Facebook®, forums, wikis, etc.

Network 104 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, mobile device 101, client devices 102A-102B include a software agent, referred to herein as an Instant Messaging (IM) client 105A-105C, respectively. Instant messaging clients 105A-105C may collectively or individually be referred to as instant messaging clients 105 or instant messaging client 105, respectively. Furthermore, server 102 includes a software agent, referred to herein as the Instant Messaging (IM) server 106. IM client 105 provides the functionality to send and receive instant messages. As messages are received, IM client 105 presents the messages to the user in a dialog window (or IM window). Furthermore, IM client 105 provides the functionality for mobile device 101, client device 102 to connect to the IM server 106 which provides the functionality of distributing the instant messages to the IM clients 105 associated with each of the sharing users.

Mobile device 101, client devices 102A-102B may further include a software agent, referred to herein as an e-mail client agent 107A-107C, respectively. E-mail client agents 107A-107C may collectively or individually be referred to as e-mail client agents 107 or e-mail client agent 107, respectively. Furthermore, server 102 may include a software agent, referred to herein as the e-mail server agent 108. E-mail client agent 107 enables the user of mobile device 101, client device 102 to create, send and receive e-mails. E-mail server agent 108 is configured to receive e-mail messages from mobile device 101, client devices 102 and distribute the received e-mail messages among the one or more mobile device 101, client devices 102.

While the preceding discusses each mobile device 101, client device 102 as including an IM client 105 and an e-mail client agent 107, each mobile device 101, client device 102 may not necessarily include each of these software agents. For example, some mobile devices 101, client devices 102 may only include an IM client 105; whereas, other mobile devices 101, client devices 102 may only include an e-mail client agent 107. In other words, each mobile device 101, client device 102 may be able to perform some or all of the functions discussed herein, such as sending/receiving e-mails, sending/receiving instant messages, sending/receiving text messages, etc. Furthermore, while the preceding discusses a single server 103 including the software agents, such as IM server 106 and e-mail server agent 108, multiple servers may be used to implement these services. Furthermore, each server 102 may not necessarily be configured to include all of these software agents, but only a subset of these software agents. For example, one particular server 102 may only include IM server 106; whereas, another particular server 102 may only include e-mail server agent 108.

Furthermore, mobile device 101 includes a software agent, referred to herein as the "analysis engine" 109, configured to prevent messages from being sent using inappropriate communication accounts as discussed further below in connection with FIGS. 2-3. Such a mobile device 101 may be used by an employee in an enterprise environment where the enterprise implements a BYOD policy. A description of the hardware configuration of mobile device 101 is provided below in connection with FIG. 2.

System 100 further includes a Short Message Service (SMC) center 110 configured to relay, store and forward text messages, such as SMS messages, among mobile device 101, client devices 102 through network 104.

System 100 further includes a social network server 111, which may be a web server configured to offer a social networking and/or microblogging service, enabling users of mobile device 101, client devices 102 to send and read other users' posts. "Posts," as used herein, include any one or more of the following: text (e.g., comments, sub-comments and replies), audio, video images, etc. Social network server 111 is connected to network 104 by wire or wirelessly. While FIG. 1 illustrates a single social network server 111, it is noted for clarity that multiple servers may be used to implement the social networking and/or microblogging service.

System 100 further includes a database 112 configured to store text analysis rules provided by other users (other users besides the user of mobile device 101) in the user's social network (i.e., the social network of the user of mobile device 101). These text analysis rules, as will be discussed further below, may be used to analyze the appropriateness of a message created by the user of mobile device 101 to be sent to one or more recipients, such as the users of client devices 102A-102B. In one embodiment, database 112, or a separate database 112, stores prior messages sent by the user of mobile device 101 to other users. Such communications may be used by analysis engine 109 to determine the appropriateness of a message created by the user of mobile device 101 to be sent to the intended recipients as discussed further below in connection with FIG. 3. In one embodiment, database 112, or a separate database 112, stores lists of allowed and/or disallowed recipients to receive messages using particular communication accounts. Such lists may be used by analysis engine 109 to identify those recipients that are approved or not approved to receive messages using various communication accounts as discussed further below in connection with FIG. 3.

System 100 is not to be limited in scope to any one particular network architecture. System 100 may include any number of mobile devices 101, client devices 102, servers 103, networks 104, SMS centers 110, social network servers 111 and databases 112.

Figure 2:
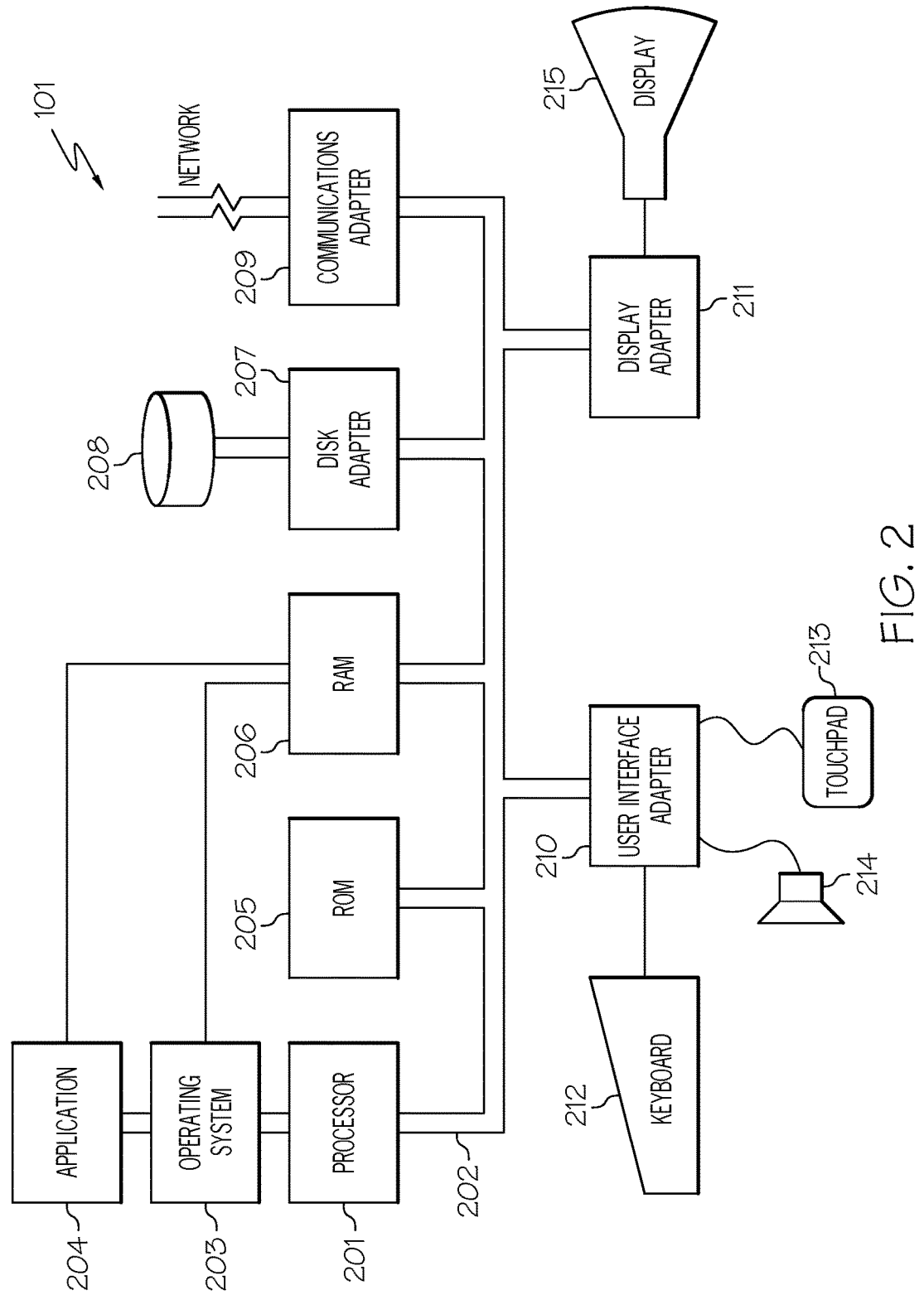
FIG. 2 illustrates a hardware configuration of a mobile device for practicing the principles of the present invention in accordance with an embodiment of the present invention.

Referring now to FIG. 2, FIG. 2 illustrates a hardware configuration of mobile device 101 (FIG. 1) which is representative of a hardware environment for practicing the present invention. Referring to FIG. 2, mobile device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, analysis engine 109 for preventing messages from being sent using inappropriate communication accounts as discussed further below in connection with FIG. 3.

Referring again to FIG. 2, read-only memory ("ROM") 205 is coupled to system bus 202 and includes a basic input/output system ("BIOS") that controls certain basic functions of mobile device 101. Random access memory ("RAM") 206 and disk adapter 207 are also coupled to system bus 202. It should be noted that software components including operating system 203 and application 204 may be loaded into RAM 206, which may be mobile device's 101 main memory for execution. Disk adapter 207 may be an integrated drive electronics ("IDE") adapter that communicates with a disk unit 208, e.g., disk drive.

Mobile device 101 may further include a communications adapter 209 coupled to bus 202. Communications adapter 209 interconnects bus 202 with an outside network thereby enabling mobile device 101 to communicate with other devices (e.g., client devices 102, server 103).

I/O devices may also be connected to mobile device 101 via a user interface adapter 210 and a display adapter 211. Keyboard 212, touchpad 213 and speaker 214 may all be interconnected to bus 202 through user interface adapter 210. A display monitor 215 may be connected to system bus 202 by display adapter 211. In this manner, a user is capable of inputting to mobile device 101 through keyboard 212 or touchpad 213 and receiving output from mobile device 101 via display 215 or speaker 214. Other input mechanisms may be used to input data to mobile device 101 that are not shown in FIG. 2, such as display 215 having touch-screen capability and keyboard 212 being a virtual keyboard. Mobile device 101 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, a growing trend among businesses is to allow employees to use their personally owned mobile devices both to access company resources and to use and access their personal applications and data. This trend, known as "bring your own device" ("BYOD"), significantly complicates the task of protecting enterprise resources, including confidential and/or sensitive information, as well as provides the opportunity for the user to inadvertently post messages using an inappropriate communication account. For example, it is common for a user to have multiple e-mail, social media and other communication accounts managed by the same mobile device. For instance, a social manager may have an official company Twitter® handle as well as a personal Twitter® handle. A message could be posted to either account via the same application on the mobile device. As a result, it is not uncommon for the user to accidentally post a message to one of the accounts (e.g., corporate account) that was meant to be posted to the other account (e.g., personal account) which contained some questionable content. In another example, a user may send company confidential information through the user's personal e-mail account (e.g., Gmail® account), as opposed to the user's company e-mail account, with less security controls thereby posing a potential security leak. Attempts have been made to address security leaks via the use of authentication credentials. However, in the BYOD scenario, the user would still be able to send confidential or sensitive information across multiple communication channels since the user has valid authentication credentials. Furthermore, the user's posting of a message, such as a message containing company confidential information, using an inappropriate communication account (e.g., personal e-mail account) may be accidental. Unfortunately, there is not currently a means for preventing such erroneous communications.

The principles of the present invention provide a means for preventing such erroneous communications as discussed below in connection with FIG. 3. FIG. 3 is a flowchart of a method 300 for preventing messages from being sent using inappropriate communication accounts in accordance with an embodiment of the present invention.

Figure 3:
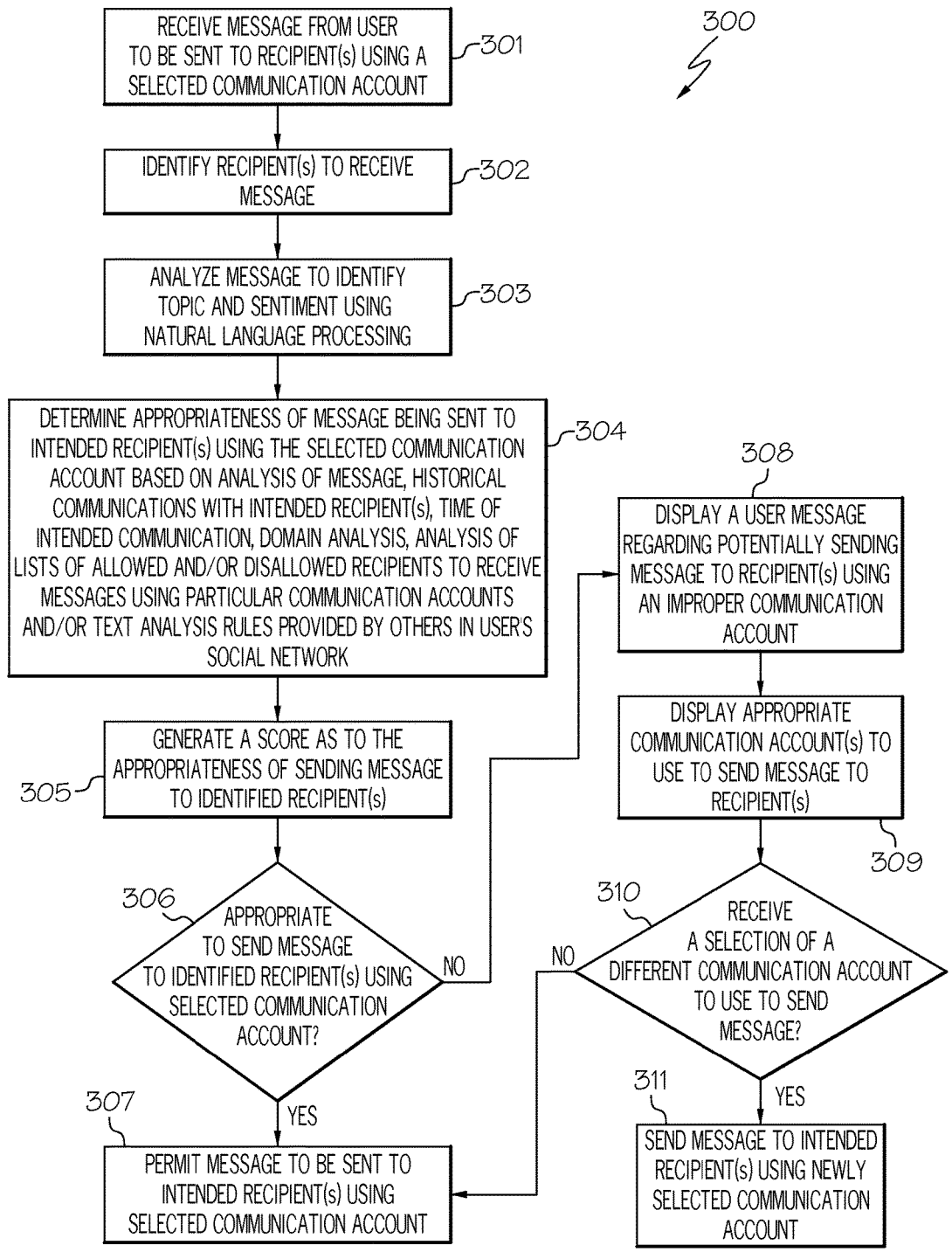
FIG. 3 is a flowchart of a method for preventing messages from being sent using inappropriate communication accounts in accordance with an embodiment of the present invention.

Referring to FIG. 3, in conjunction with FIGS. 1-2, in step 301, analysis engine 109 receives a message created by the user of mobile device 101 to be sent to recipient(s) (e.g., users of client devices 102A, 102B) using a selected communication account (e.g., personal e-mail account, personal social media account). In one embodiment, the user of mobile device 101 is an employee in an enterprise environment where the enterprise implements a BYOD policy.

In step 302, analysis engine 109 identifies the recipient(s) to receive the message. For example, the user of mobile device 101 may create a message to be sent to the users of client devices 102A, 102B. Analysis engine 109 would then identify those users as the intended recipients to receive the message.

In step 303, analysis engine 109 analyzes the messages to identify the topic and sentiment using natural language processing. The "topic" refers to the main subject of the message. For example, analysis engine 109 may identify the topic of the message by focusing on keywords, such as "travel," "sports," and "cars," when analyzing the message using natural language processing. The "sentiment" refers to the attitude of the author with respect to the topic or overall contextual polarity of the message. For example, analysis engine 109 may identify the sentiment of the message by focusing on keywords, such as "dislike," "disdain," and "cheery," when analyzing the message using natural language processing.

In step 304, analysis engine 109 determines the appropriateness of the message being sent to the intended recipient(s) using the selected communication account based on the analysis of message (discussed in step 303), historical communications with the intended recipient(s), the time of the intended communication, domain analysis, analysis of lists of allowed and/or disallowed recipients to receive messages using particular communication accounts and/or text analysis rules provided by others (i.e., other users besides the user of mobile device 101) in the user's social network (i.e., the social network of the user of mobile device 101).

As discussed above, a factor that may be used to determine the appropriateness of the message being sent to the intended recipient(s) is based on the analysis of the message discussed in step 303. For example, if the topic of the message relates to product marketing material, then such a message may not be appropriate to be sent using the user's personal e-mail account (e.g., Yahoo!® e-mail account). In another example, if the sentiment of the message is a scathing political tweet, such a tweet should not be posted on the user's company Twitter® account.

Another factor that may be used to determine the appropriateness of the message being sent to the intended recipient(s) is based on historical or past communications with the intended recipient(s). Such communications may be stored in database 112, where, in one embodiment, each of the communications sent by the user of mobile device 101 to a recipient is stored in database 112. In one embodiment, the message created by the user of mobile device 101 may reference a historical communication with the intended recipient(s). By having access to such communications (e.g., e-mails), a clearer understanding of the created message may be obtained. For example, the message created by the user of mobile device 101 may reference a prior communication which talked about the user's dog. By having access to such prior communications, analysis engine 109 may determine the appropriateness of sending the message to the intended recipients using the user's selected communication account using natural language processing, where keywords, such as "dog," in the referenced prior communication are identified and analyzed using natural language processing. For instance, if the user of mobile device 101 intended to send the message to the user's manager, then such a message may not be appropriate since it references a historical communication relating to the user's dog.

Another factor that may be used to determine the appropriateness of the message being sent to the intended recipient(s) is the time of the intended communication. For example, the user of mobile device 101 may typically send work e-mails between 8:00 am and 5:00 pm and send personal e-mails during the other hours. Hence, if the user of mobile device 101 intends to send a message using a work e-mail account at around midnight, such a message may not be appropriate to be sent using the user's work e-mail account.

Another factor that may be used to determine the appropriateness of the message being sent to the intended recipient(s) is domain analysis. Domain analysis refers to comparing the domain part of the e-mail address of the intended recipient with the user's selected communication account. For example, if the user of mobile device 101 intends to send a message to john.doe@us.ibm.com using the user's Gmail® account, then such a message may not be appropriate to be sent using the user's personal e-mail account. Such a message may need to be sent using the user's company e-mail account.

An additional factor that may be used to determine the appropriateness of the message being sent to the intended recipient(s) is analyzing lists of allowed and/or disallowed recipients to receive messages using particular communication accounts. Such lists may be stored in database 112 which indicate recipients that are approved or not approved to receive messages using various communication accounts. For example, if the user of mobile device 101 intends to send a message to a recipient using the user's company e-mail account but the recipient is identified on the list as not being allowed to receive messages form the user's company e-mail account, then such a message may not be appropriate to be sent to the recipient using the user's company e-mail account.

Another factor that may be used to determine the appropriateness of the message being sent to the intended recipient(s) is text analysis rules provided by others (i.e., other users besides the user of mobile device 101) in the user's social network (i.e., the social network of the user of mobile device 101). Text analysis rules refers to the association of the use of certain keywords in messages that imply the use of particular communication account. For example, the use of the phrase "my bad" or "chillin" may be appropriate for non-business communications and hence would be limited to communications using personal communication accounts, such as a personal e-mail account or a personal social media account. Such text analysis rules may be formed by other users in the user's social network thereby allowing the user of mobile device 101 to populate the data set used by analysis engine 109 to determine the appropriateness of the message being sent to the intended recipient(s).

In step 305, analysis engine 109 generates a score as to the appropriateness of sending the message to the intended recipient(s). Such a score is based on the analysis of step 304. For example, the greater the likelihood that the message is appropriate to be sent to the intended recipients based on the factors discussed above in step 304, the higher the score. Such a score may then be compared with a threshold value, which may be user selected, to determine whether to permit or prevent the user from sending the message to the intended recipient(s).

In step 306, a determination is made by analysis engine 109 as to whether it is appropriate to send the message to the intended recipient(s) using the selected communication account.

If it is appropriate to send the message to the intended recipient(s) using the selected communication account, then, in step 307, analysis engine 109 permits the message to be sent to the intended recipient(s) using the selected communication. For example, if the score generated in step 305 exceeds a threshold value, then the message is deemed to be appropriate to be sent to the intended recipients (e.g., user of client device 102B) using the selected communication account (e.g., company social media account).

If, however, it is not appropriate to send the message to the intended recipient(s) using the selected communication account, then, in step 308, analysis engine 109 displays a user message (e.g., a message is displayed to the user of mobile device 101 on display 215) regarding potentially sending a message to recipient(s) using an improper communication account. For example, if the score generated in step 305 is less than a threshold value, then the message is deemed to not be appropriate to be sent to the intended recipients (e.g., user of client device 102B) using the selected communication account (e.g., company social media account). In this manner, potentially erroneous communications, such as accidentally posting a message to a wrong social media account or e-mailing company confidential information using a personal e-mail account, may be prevented.

In step 309, analysis engine 109 displays the appropriate communication account(s) to use to send the message to the intended recipient(s). For example, the appropriate communication accounts, such as the user's personal social media account and the user's personal e-mail account, may be displayed to the user of mobile device 101 on display 215 to allow the user to select a different communication account to use to send the message.

In step 310, a determination is made by analysis engine 109 as to whether the user selected a different communication account to use to send the message. That is, a determination is made by analysis engine 109 as to whether the user selected one of the appropriate communication accounts displayed to the user in step 309.

If the user did not select a different communication account to use to send the message, then analysis engine 109 permits the message to be sent to the intended recipient(s) using the selected communication in step 307.

If, however, the user selected a different communication account to use to send the message, then, in step 311, analysis engine 109 sends the message to the intended recipient(s) using the newly selected communication account.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for preventing messages from being sent using inappropriate communication accounts, the computer program product comprising a computer readable storage medium having program code embodied therewith, the program code comprising the programming instructions for:
receiving a message from a user to be sent to one or more recipients using a selected communication account;
identifying said one or more recipients to receive said message;
analyzing said message to identify a topic and a sentiment using natural language processing;
determining an appropriateness of said message to be sent to said one or more recipients using said selected communication account based on said analysis of said message and the following: historical communications with said one or more recipients, domain analysis, analysis of lists of allowed and/or disallowed recipients to receive messages using particular communication accounts and text analysis rules provided by other users in a social network of said user;
generating a score as to the appropriateness of sending said message to said one or more recipients based on said determination of said appropriateness of said message; and
displaying a user message regarding potentially sending said message to said one or more recipients using an inappropriate communication account in response to said score being less than a threshold.

2. The computer program product as recited in claim 1, wherein the program code further comprises the programming instructions for:
displaying one or more appropriate communication accounts to use to send said message to said one or more recipients in response to said score being less than said threshold.

3. The computer program product as recited in claim 2, wherein the program code further comprises the programming instructions for:
sending said message to said one or more recipients using a communication account selected from said displayed one or more appropriate communication accounts.

4. The computer program product as recited in claim 1, wherein said message comprises one of the following: an electronic message, an instant message, a text message and a post to a social media website.

5. The computer program product as recited in claim 1, wherein said selected communication account comprises one of the following: an e-mail account and a social media account.

6. A system, comprising:
a memory unit for storing a computer program for preventing messages from being sent using inappropriate communication accounts; and
a processor coupled to the memory unit, wherein the processor is configured to execute the program instructions of the computer program comprising:
receiving a message from a user to be sent to one or more recipients using a selected communication account;
identifying said one or more recipients to receive said message;
analyzing said message to identify a topic and a sentiment using natural language processing;
determining an appropriateness of said message to be sent to said one or more recipients using said selected communication account based on said analysis of said message and the following: historical communications with said one or more recipients, domain analysis, analysis of lists of allowed and/or disallowed recipients to receive messages using particular communication accounts and text analysis rules provided by other users in a social network of said user;
generating a score as to the appropriateness of sending said message to said one or more recipients based on said determination of said appropriateness of said message; and displaying a user message regarding potentially sending said message to said one or more recipients using an inappropriate communication account in response to said score being less than a threshold.

7. The system as recited in claim 6, wherein the program instructions of the computer program further comprises:

displaying one or more appropriate communication accounts to use to send said message to said one or more recipients in response to said score being less than said threshold.

8. The system as recited in claim 7, wherein the program instructions of the computer program further comprises:

sending said message to said one or more recipients using a communication account selected from said displayed one or more appropriate communication accounts.

9. The system as recited in claim 6, wherein said message comprises one of the following: an electronic message, an instant message, a text message and a post to a social media website.

10. The system as recited in claim 6, wherein said selected communication account comprises one of the following: an e-mail account and a social media account.

\* \* \* \* \*